(12) United States Patent
Lee

(10) Patent No.: US 7,077,518 B1
(45) Date of Patent: Jul. 18, 2006

(54) EYEGLASS TEMPLE ASSEMBLY

(76) Inventor: John Lee, 12F, No. 100, Sec. 1, Ho-Ping W. Rd., Taipei City (TW)

( * ) Notice: Subject to any disclaimer, the term of this patent is extended or adjusted under 35 U.S.C. 154(b) by 0 days.

(21) Appl. No.: 11/265,923

(22) Filed: Nov. 3, 2005

(51) Int. Cl.
  *G02C 5/16* (2006.01)
(52) U.S. Cl. .................. 351/113; 351/111; 351/153; 16/228
(58) Field of Classification Search ............... 351/113, 351/153, 111, 114, 117, 118; 16/228
See application file for complete search history.

(56) References Cited

U.S. PATENT DOCUMENTS 6,353,965 B1 * 3/2002 Lo .................. 16/228
6,910,247 B1 * 6/2005 Tabacchi ............... 16/228
6,952,859 B1 * 10/2005 Wagner .............. 16/228

* cited by examiner

*Primary Examiner*—Hung Xuan Dang
(74) *Attorney, Agent, or Firm*—Ladas & Parry LLP

(57) ABSTRACT

An eyeglass temple assembly includes a connector rod having a hooked end, a temple shaft having a rod-disposing compartment with an open end for extension of the connector rod therethrough and into the rod-disposing compartment, a positioning component received fittingly in the open end of the rod-disposing compartment and having an opening for extension of the connector rod therethrough, a rod-connecting component disposed in the rod-disposing compartment, coupled to the hooked end of the connector rod, and including a block body having opposite first and second sides, and an urging member disposed in the rod-disposing compartment, sleeved around the connector rod, and having two ends that abut respectively against the positioning component and the first side of the block body of the rod-connecting component.

8 Claims, 8 Drawing Sheets

EYEGLASS TEMPLE ASSEMBLY

BACKGROUND OF THE INVENTION

1. Field of the Invention

The invention relates to an eyeglass temple assembly, more particularly to an eyeglass temple assembly adapted to be pivoted to an eyeglass frame.

2. Description of the Related Art

For many eyeglass wearers, not only are prescriptions on lenses critical, but comfort in wearing the eyeglasses, which is directly related to the design of eyeglass temples, is also of important consideration. A pair of conventional eyeglasses includes an eyeglass frame and two eyeglass temples that are pivoted respectively to two opposite ends of the eyeglass frame, and that are adapted to be worn on ears of the eyeglass wearer. The eyeglass temples normally overlap each other when stowed away, and are pivoted away from each other when in use for a maximum distance that is equal to the length of the eyeglass frame. However, since the length of the eyeglass frame is fixed after fabrication, when applied to a person having a face that is wider than the length of the eyeglass frame, not only is the pair of eyeglasses subject to unrecoverable deformation, but the face of the eyeglass wearer is also squeezed uncomfortably by the eyeglass temples.

SUMMARY OF THE INVENTION

Therefore, the object of the present invention is to provide an eyeglass temple assembly adapted to be pivoted to an eyeglass frame, and provided with an urging member such that when two of the eyeglass temple assemblies are pivoted respectively to two opposite ends of the eyeglass frame, the eyeglass temple assemblies are operable so as to form a distance therebetween that is longer than the length of the eyeglass frame.

According to the present invention, there is provided an eyeglass temple assembly that includes a connector rod, a temple shaft, a positioning component, a rod-connecting component, and an urging member. The connector rod has a pivot end that is adapted to be pivoted to the eyeglass frame, and a hooked end opposite to the pivot end. The temple shaft has a rod-disposing compartment with an open end for extension of the connector rod therethrough and into the rod-disposing compartment. The positioning component is received fittingly in the open end of the rod-disposing compartment, and has an opening for extension of the connector rod therethrough. The rod-connecting component is disposed in the rod-disposing compartment, is coupled to the hooked end of the connector rod, and includes a block body having opposite first and second sides. The urging member is disposed in the rod-disposing compartment, is sleeved around the connector rod, and has two ends that abut respectively against the positioning component and the first side of the block body of the rod-connecting component.

The block body of the rod-connecting component is formed with an elongated through-hole extending from the first side to the second side of the block body for extension of the hooked end of the connector rod therethrough. The hooked end of the connector rod is turnable relative to the block body, and abuts against the second side of the block body by virtue of urging action of the urging member.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
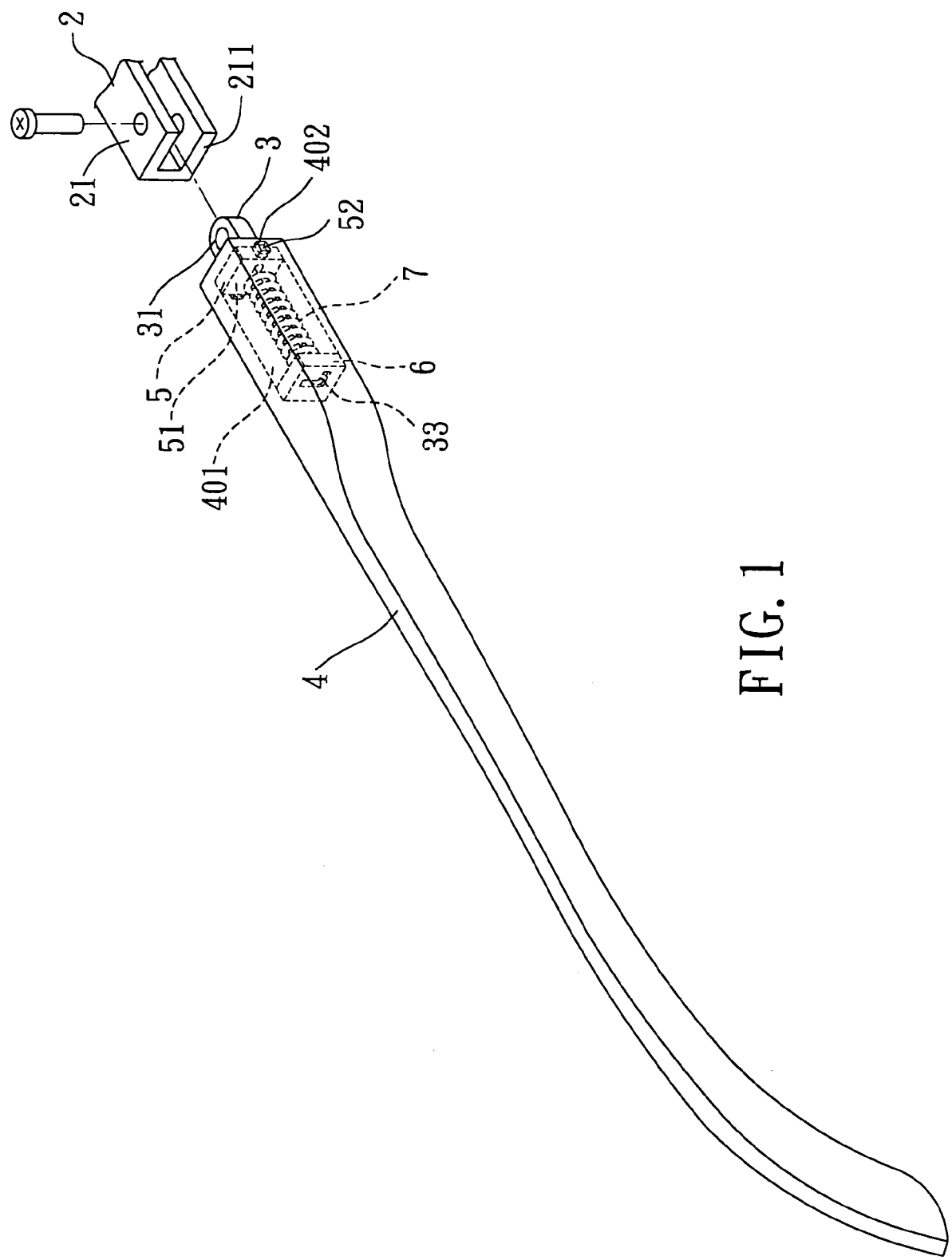
FIG. 1 is an assembled perspective view of the preferred embodiment of an eyeglass temple assembly according to the present invention, illustrating the relation between the eyeglass temple assembly and an end portion of an eyeglass frame.
Figure 2:
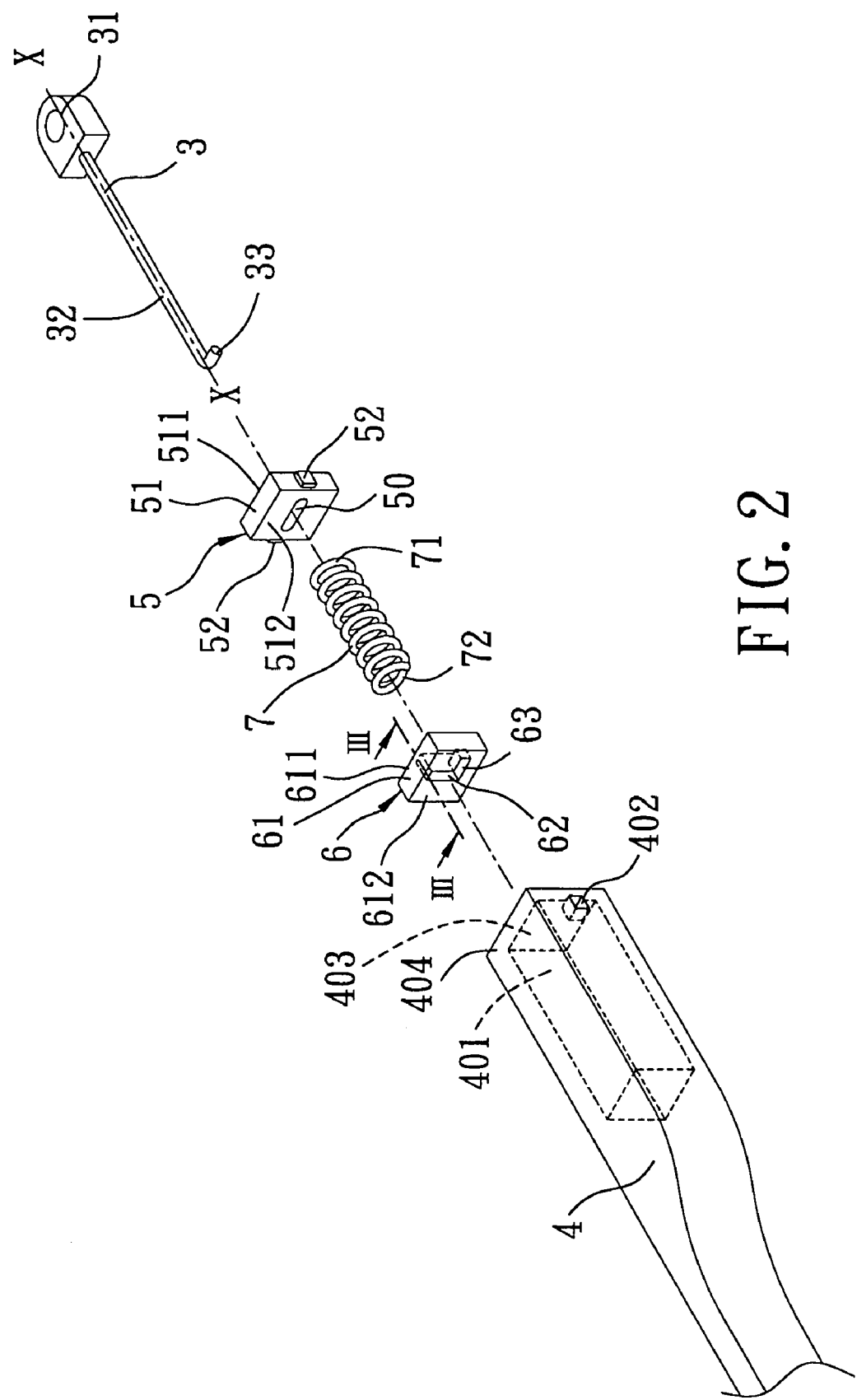
FIG. 2 is a fragmentary exploded perspective view of the preferred embodiment.

As shown in FIG. 1 and FIG. 2, the preferred embodiment of an eyeglass temple assembly according to the present invention is adapted to be connected pivotally to a pivot seat 21 of an eyeglass frame 2 (partially shown in FIG. 1) for wearing on an ear of a user. The eyeglass temple assembly includes a connector rod 3, a temple shaft 4, a positioning component 5, a rod-connecting component 6, and an urging member 7.

The connector rod 3 has a pivot end 31 that is adapted to be pivoted to the pivot seat 21 of the eyeglass frame 2, a hooked end 33 opposite to the pivot end 31, and an extension segment 32 extending from the pivot end 31 to the hooked end 33 along a longitudinal direction (X) and having a cross-section smaller than that of the pivot end 31.

The temple shaft 4 has a rod-disposing compartment 401 with an open end 403 for extension of the connector rod 3 therethrough and into the rod-disposing compartment 401. The temple shaft 4 has an outer peripheral surface 404 that surrounds the open end 403. The temple shaft 4 is further formed with two opposite pits 402 that are disposed proximate to the open end 403 and that are in spatial communication with the rod-disposing compartment 401.

The positioning component 5 is received fittingly in the open end 403 of the rod-disposing compartment 401, and has an opening 50 for extension of the connector rod 3 movably therethrough. The positioning component 5 includes a main body 51 that is provided with two opposite bumps 52 capable of engaging the pits 402 in the temple shaft 4 for securing the positioning component 5 fittingly in the open end 403 of the rod-disposing compartment 401. In this embodiment, the opening 50 is formed in the main body 51 and extends in a direction transverse to the longitudinal direction (X).

The rod-connecting component 6 is disposed in the rod-disposing compartment 401, is coupled to the hooked end 33 of the connector rod 3, and includes a block body 61 having opposite first and second sides 611, 612.

The urging member 7 is disposed in the rod-disposing compartment 401, is sleeved around the connector rod 3, and has first and second ends 71, 72 that abut respectively against the positioning component 5 and the first side 611 of the block body 61 of the rod-connecting component 6.

Figure 3:
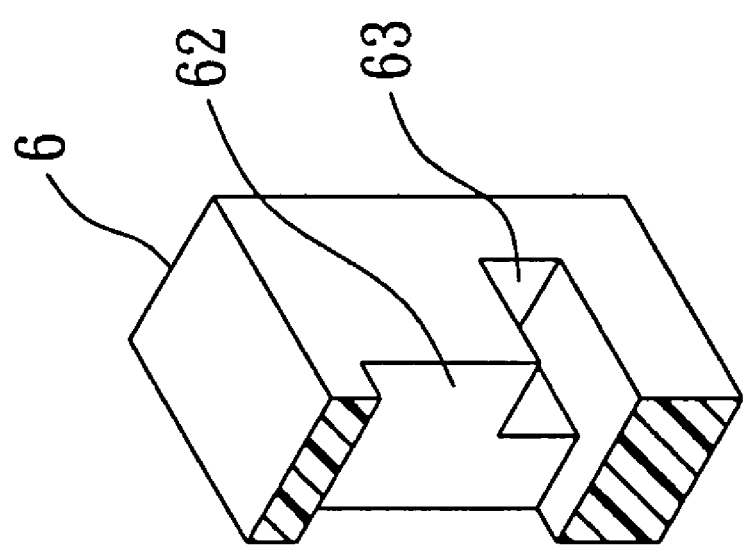
FIG. 3 is an enlarged sectional view of a rod-connecting component taken along line III—III in FIG. 2.

The block body 61 is formed with an elongated through-hole 62 extending from the first side 611 to the second side 612 of the block body 61 for extension of the hooked end 33 of the connector rod 3 therethrough. The hooked end 33 of the connector rod 3 is turnable relative to the block body 61, and abuts against the second side 612 of the block body 61 by virtue of urging action of the urging member 7. In this embodiment, the block body 61 is further formed with a horizontal recess 63 that extends from the through-hole 62, that forms an angle with the through-hole 62, and that is indented inwardly from the second side 612 of the block body 61, as best illustrated in FIG. 3. The hooked end 33 of the connector rod 3 is received in the horizontal recess 63. In this embodiment, the angle between the through-hole 62 and the horizontal recess 63 is substantially ninety degrees.

In this embodiment, the connector rod 3, the temple shaft 4, the positioning component 5, and the rod-connecting component 6 are made from plastic materials. However, this invention is not limited to this particular aspect.

Figure 4:
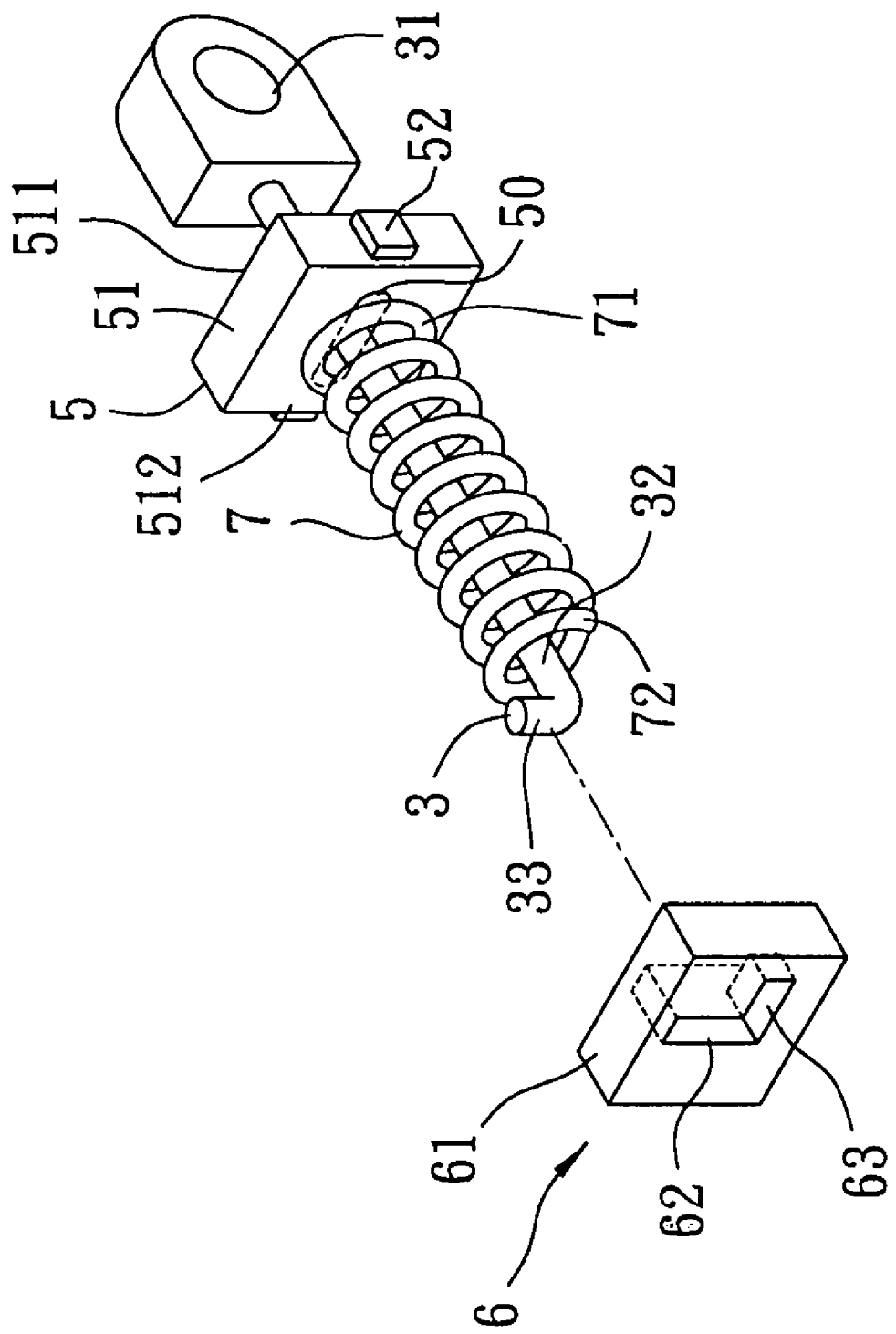
FIG. 4 is a partly-assembled perspective view of the preferred embodiment.
Figure 7:
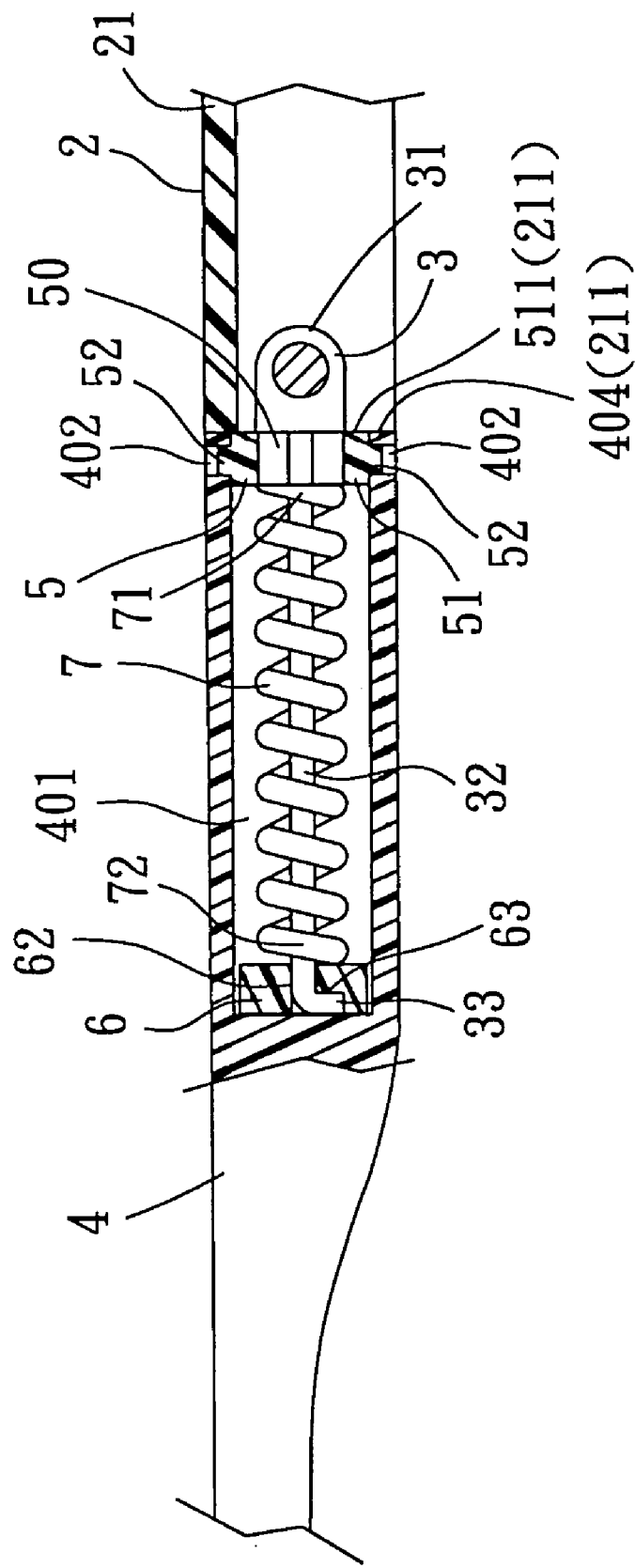
FIG. 7 is an enlarged fragmentary partly-sectional view of the preferred embodiment when applied to the eyeglass frame for form a pair of eyeglasses, illustrating a normal-use state of the eyeglasses.

As shown in FIG. 4, to assemble the eyeglass temple assembly, the hooked end 33 of the connector rod 3 is extended through the opening 50 in the main body 51 of the positioning component 5, such that the extension segment 32 also extends through the opening 50, and such that the pivot end 31 abuts against a front side 511 of the main body 51, as best illustrated in FIG. 7.

The urging member 7 is then sleeved around the extension segment 32 of the connector rod 3. In this embodiment, the urging member 7 is a compression spring capable of storing an elastic restoring force after being compressed. However, since the feature of the present invention does not reside in the specific configuration of the urging member 7, it should not be relied upon to limit the scope of the invention.

Figure 5:
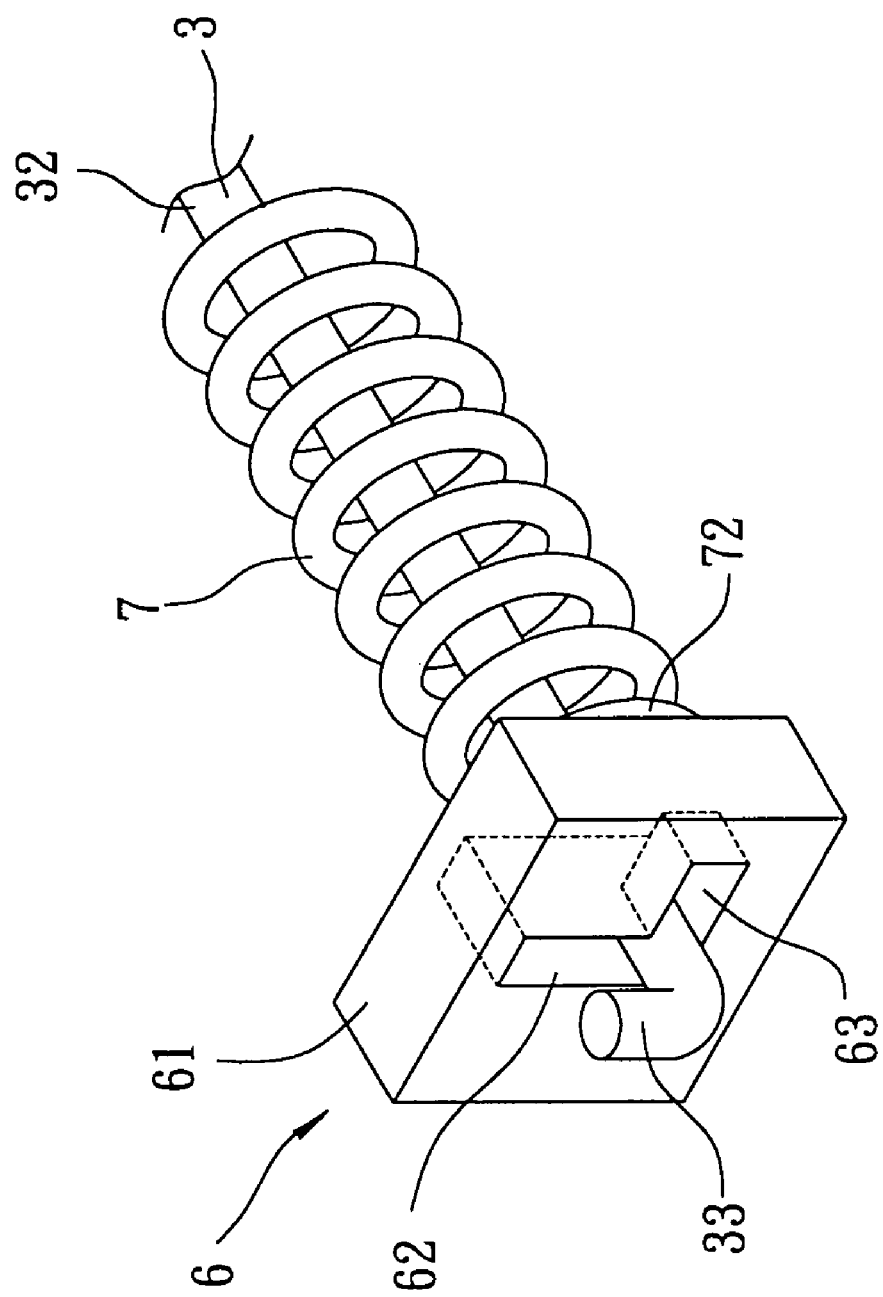
FIG. 5 is an enlarged fragmentary partly-assembled perspective view of the preferred embodiment, illustrating a hooked end of a connector rod extending through a through-hole in the rod-connecting component.
Figure 6:
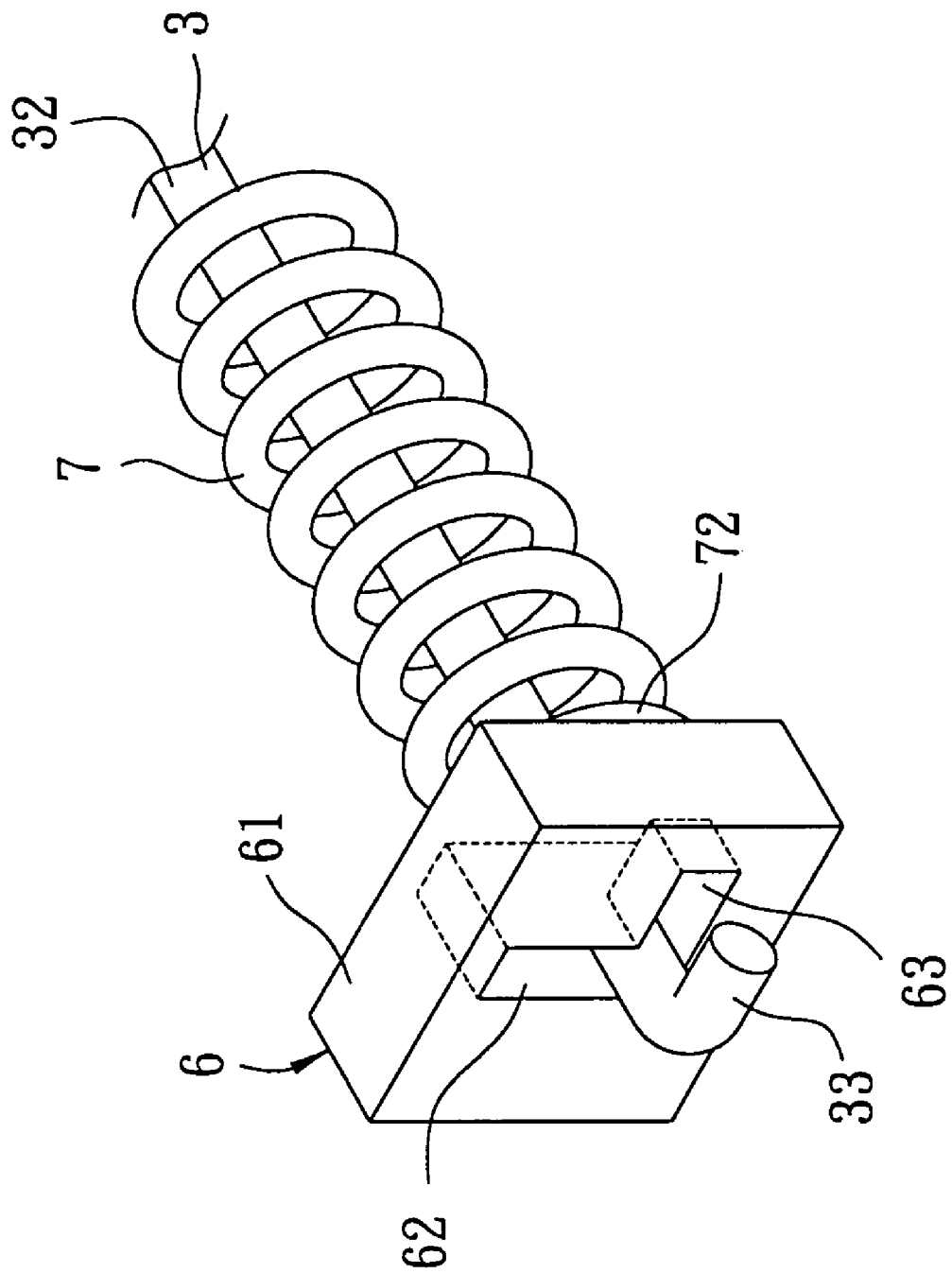
FIG. 6 is an enlarged fragmentary partly-assembled perspective view of the preferred embodiment, illustrating the hooked end of the connector rod forming an angle with the through-hole in the rod-connecting component.

Subsequently, as shown in FIG. 5, the hooked end 33 of the connector rod 3 is extended through the through-hole 62 in the block body 61 of the rod-connecting component 6, such that the first and second ends 71, 72 of the urging member 7 abut respectively against a back side 512 of the main body 51 of the positioning component 5 and the first side 611 of the block body 61 of the rod-connecting component 6, and such that the urging member 7 is compressed between the rod-connecting component 6 and the positioning component 5. An elastic restoring force is thus stored in the urging member 7. Next, as shown in FIG. 6, the connector rod 3 is turned at an angle such that the hooked end 33 of the connector rod 3 is registered with the recess 63 in the block body 61 of the rod-connecting component 6. Due to the elastic restoring force stored in the urging member 7, the rod-connecting component 6 is pushed away from the positioning component 5, such that the hooked end 33 is received in the recess 63. The first and second ends 71, 72 of the urging member 7 still abut respectively against the back side 512 of the main body 51 of the positioning component 5 and the first side 611 of the block body 61 of the rod-connecting component 6, such that the urging member 7 is constantly disposed between the positioning component 5 and the rod-connecting component 6.

Finally, the rod-connecting component 6, the urging member 7, and the hooked end 33 and extension segment 34 of the connector rod 3 are disposed in the rod-disposing compartment 401 in the temple shaft 4. At the same time, the bumps 52 of the main body 51 are received in the pits 402 in the temple shaft 4, such that the main body 51 of the positioning component 5 is received fittingly in the open end 403 of the rod-disposing compartment 401, as best illustrated in FIG. 1 and FIG. 7.

Two of the eyeglass temple assemblies are applied to the eyeglass frame 2 at two opposite ends of the latter to form a pair of eyeglasses by connecting each of the pivot ends 31 of the connector rods 3 to the pivot seat 21 at the respective end of the eyeglass frame 2. Due to the unique relationship among the various components of the eyeglass temple assembly, three different functional states are available for the eyeglasses thus formed.

The eyeglasses are in a folded state (not shown) when the two eyeglass temple assemblies overlap each other, so that the eyeglasses can be stowed away safely. The eyeglasses are in a normal-use state (refer to FIG. 7) when the eyeglasses are worn by a user whose face is not wider than the length of the eyeglass frame 2. In the normal-use state of the eyeglasses, the outer peripheral surface 404 of the temple shaft 4 and the front side 511 of the main body 51 of the positioning component 5 are both in full contact with a contact surface 211 of the pivot seat 21 of the eyeglass frame 2. The eyeglasses are in an expanded state (refer to FIG. 8) when the eyeglasses are worn by a user whose face is wider than the length of the eyeglass frame 2, where the eyeglass temple assemblies are operable so as to form a distance between each other that is longer than the length of the eyeglass frame 2.

Figure 8:
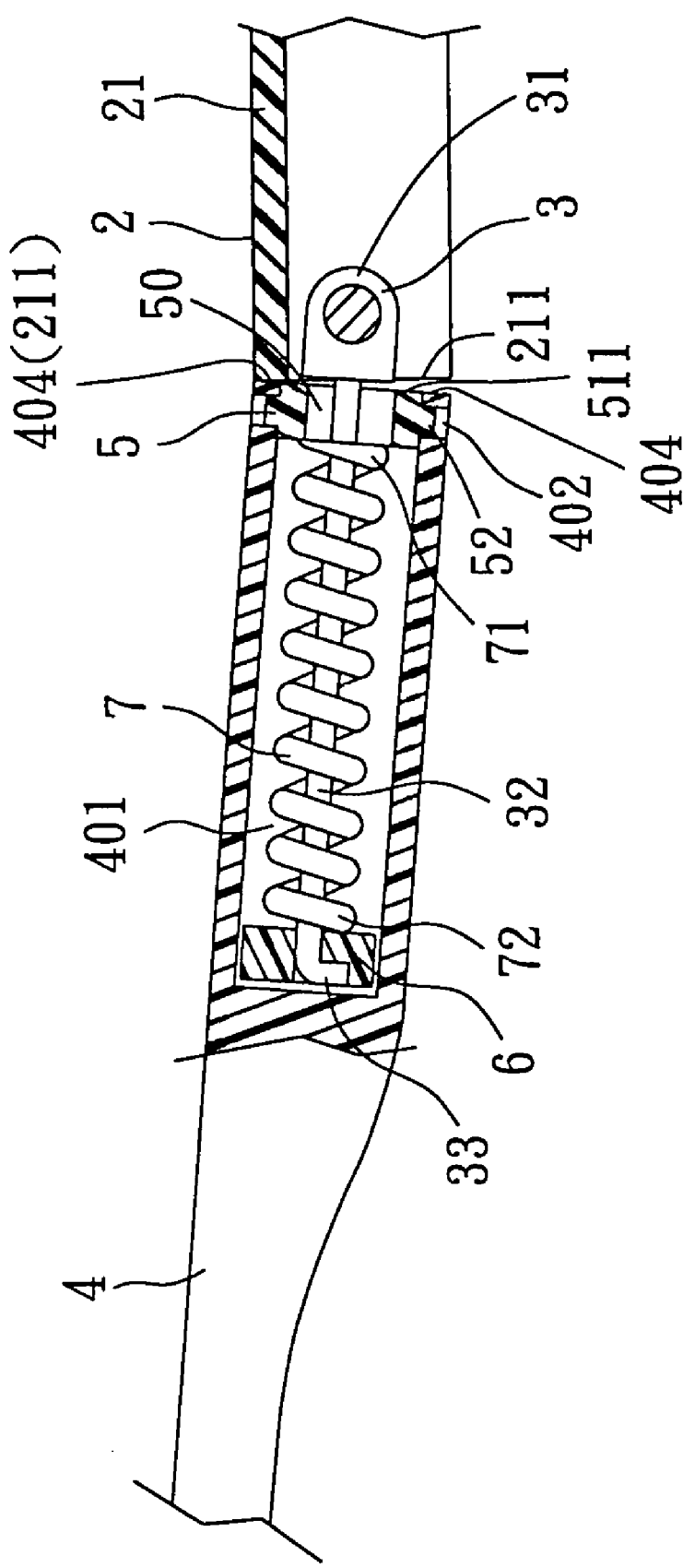
FIG. 8 is an enlarged fragmentary partly-sectional view of the preferred embodiment when applied to the eyeglass frame as in FIG. 7, illustrating an expanded state of the eyeglasses.

As shown in FIG. 8, when the eyeglasses are in the expanded state, the temple shaft 4 of each of the eyeglass temple assemblies is pivoted relative to the eyeglass frame 2 such that the outer portion of the outer peripheral surface 404 of the temple shaft 4 is in contact with the outer portion of the contact surface 211 of the eyeglass frame 2, and the front side 511 of the main body 51 of the positioning component 5 and the inner portion of the outer peripheral surface 404 are separated from the inner portion of the contact surface 211. The positioning component 5 moves along with the temple shaft 4 since the positioning component 5 is received fittingly in the open end 403 of the rod-disposing compartment 401. As the temple shaft 4 pivots away from the contact surface 211 of the pivot seat 21, the connector rod 3 moves relative to the positioning component 5 inside the opening 50 in the main body 51 of the positioning component 5, such that a section of the extension segment 32 of the connector rod 3 proximate to the pivot end 31 is disposed outside the rod-disposing compartment 401. At the same time, the urging member 7 is compressed as the positioning component 5 moves away from the eyeglass frame 2, such that an elastic restoring force is stored in the urging member 7.

As the user with a wider face takes off the eyeglasses, the eyeglasses move from the expanded state to the normal-use state by virtue of the urging action of the urging member 7, where the elastic restoring force stored in the urging member 7 pushes the rod-connecting component 6 away from the positioning component 5. The temple shaft 4 is thus pivoted relative to connector rod 3, such that the outer peripheral surface 404 of the temple shaft 4 and the front side 511 of the main body 51 of the positioning component 5 are both in full contact with the contact surface 211 of the pivot seat 21.

It should be noted herein that the positioning component 6 can be formed integrally with the hooked end 33 of the connector rod 3 in other embodiments of the present invention. In addition, it is not necessary for the positioning component 5 to be received fittingly in the open end 403 of the rod-disposing compartment 401, as long as the positioning component 5 is coupled to the temple shaft 4.

Therefore, the eyeglass temple assembly according to the present invention is applied to the eyeglass frame to facilitate wearing of the assembled eyeglasses by those users whose faces are wider than the length of the eyeglass frame, such that the eyeglass frame 2 and the temple shaft 4 are not subject to deformation, and such that comfort when wearing the eyeglasses is ensured.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. An eyeglass temple assembly adapted to be pivoted to an eyeglass frame, said eyeglass temple assembly comprising:
    a connector rod having a pivot end that is adapted to be pivoted to the eyeglass frame, and a hooked end opposite to said pivot end;
    a temple shaft having a rod-disposing compartment with an open end for extension of said connector rod there through and into said rod-disposing compartment;
    a positioning component received fittingly in said open end of said rod-disposing compartment, and having an opening for extension of said connector rod therethrough;
    a rod-connecting component disposed in said rod-disposing compartment, coupled to said hooked end of said connector rod, and including a block body having opposite first and second sides; and
    an urging member disposed in said rod-disposing compartment, sleeved around said connector rod, and having two ends that abut respectively against said positioning component and said first side of said block body of said rod-connecting component;
    wherein said block body of said rod-connecting component is formed with an elongated through-hole extending from said first side to said second side of said block body for extension of said hooked end of said connector rod therethrough, said hooked end of said connector rod being turnable relative to said block body and abutting against said second side of said block body by virtue of urging action of said urging member.

2. The eyeglass temple assembly as claimed in claim 1, wherein said block body of said rod-connecting component is further formed with a horizontal recess that extends from said through-hole, that forms an angle with said through-hole, and that is indented inwardly from said second side of said block body, said hooked end of said connector rod being received in said horizontal recess.

3. The eyeglass temple assembly as claimed in claim 2, wherein said angle is substantially ninety degrees.

4. The eyeglass temple assembly as claimed in claim 1, wherein said temple shaft is formed with two opposite pits that are disposed proximate to said open end and that are in spatial communication with said rod-disposing compartment;
    said positioning component being provided with two opposite bumps capable of engaging said pits in said temple shaft for securing said positioning component fittingly in said open end of said rod-disposing compartment.

5. The eyeglass temple assembly as claimed in claim 1, wherein said connector rod is made from a plastic material.

6. The eyeglass temple assembly as claimed in claim 1, wherein said temple shaft is made from a plastic material.

7. The eyeglass temple assembly as claimed in claim 1, wherein said positioning component is made from a plastic material.

8. The eyeglass temple assembly as claimed in claim 1, wherein said rod-connecting component is made from a plastic material.

* * * * *